H. SALMON.
PROCESS FOR THE MANUFACTURE OF EXPANDED METAL.
APPLICATION FILED JUNE 15, 1912.

1,043,733.

Patented Nov. 5, 1912.

3 SHEETS—SHEET 1.

Witnesses.
Inventor
By his Attorneys

H. SALMON.
PROCESS FOR THE MANUFACTURE OF EXPANDED METAL.
APPLICATION FILED JUNE 15, 1912.
1,043,733.
Patented Nov. 5, 1912.
3 SHEETS—SHEET 2.
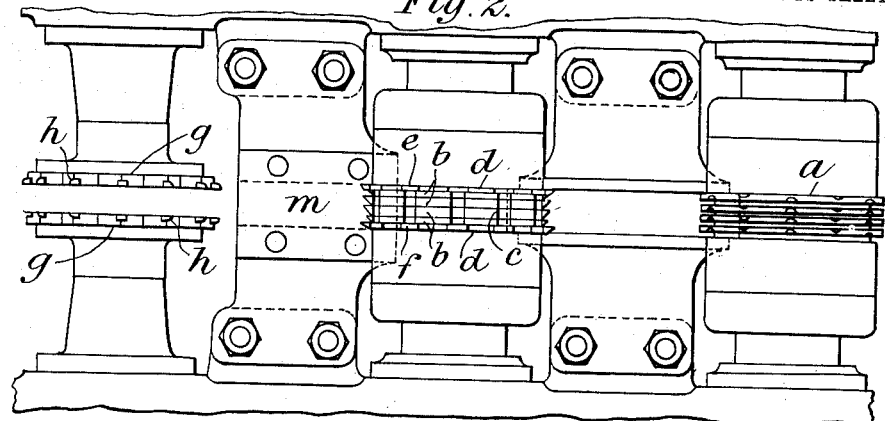
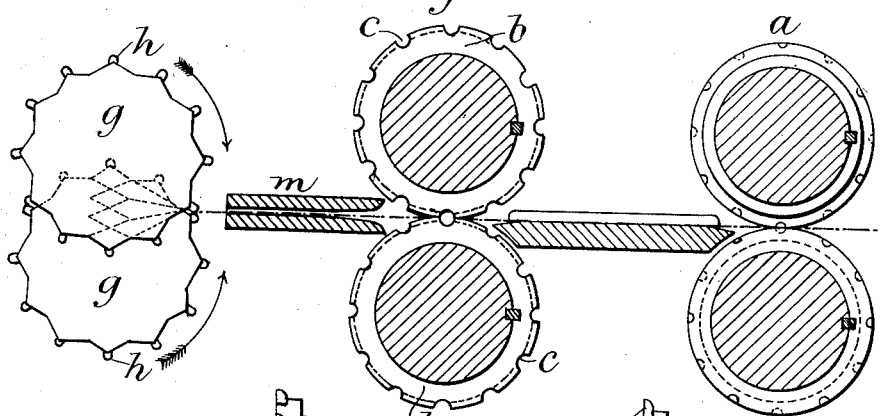
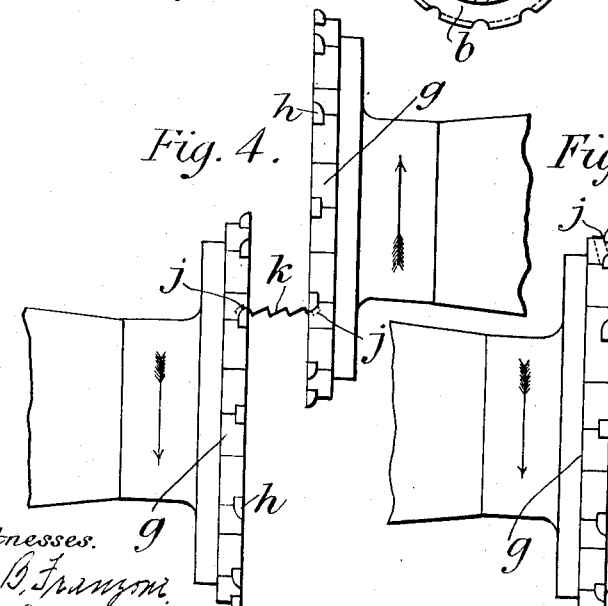
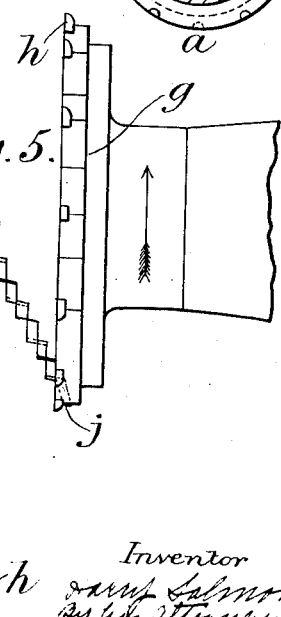
Witnesses.
E. B. Franzon
M. E. Burrell
Inventor
Harry Salmon
By his attorney
Baldwin Wright H. SALMON.
PROCESS FOR THE MANUFACTURE OF EXPANDED METAL.
APPLICATION FILED JUNE 15, 1912.

1,043,733.

Patented Nov. 5, 1912.

3 SHEETS—SHEET 3.

UNITED STATES PATENT OFFICE.

HARRY SALMON, OF WESTMINSTER, ENGLAND, ASSIGNOR TO THE EXPANDED METAL COMPANY, LIMITED, OF WESTMINSTER, ENGLAND.

PROCESS FOR THE MANUFACTURE OF EXPANDED METAL.

1,043,733.  Specification of Letters Patent.  Patented Nov. 5, 1912.

Application filed June 15, 1912. Serial No. 703,948.

*To all whom it may concern:*

Be it known that I, HARRY SALMON, a subject of the King of Great Britain, residing at York Mansion, York street, in the city of Westminster, England, have invented an Improved Process for the Manufacture of Expanded Metal, of which the following is a specification.

According to this invention the sheet is first slit in the ordinary way thus dividing it into parallel strips connected by junctions of uncut metal. The slit sheet is then passed through rolls by which the strips are turned in pairs in the same direction to an angle to the plane of the sheet and at the same time holes are formed at the two edges of the sheet. Finally the sheet thus prepared is expanded by means of a pair of wheels revolving in opposite directions and provided with teeth which enter the holes, the axes of such wheels being arranged one above and the other below the plane of the sheet.

The drawings show a machine arranged to deal with a slit sheet consisting of eight parallel strips but it will be understood that the machine can be readily adapted to deal with any width or thickness of sheet.

Figure 1:
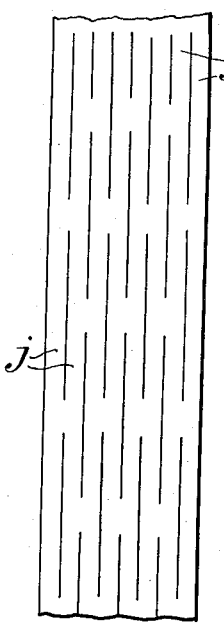
Figure 10:
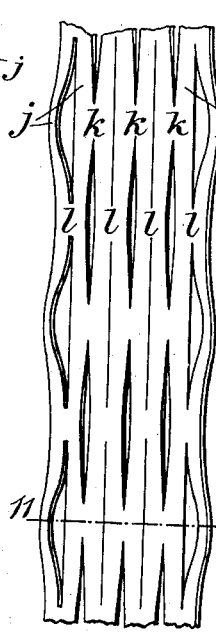
Figure 12:
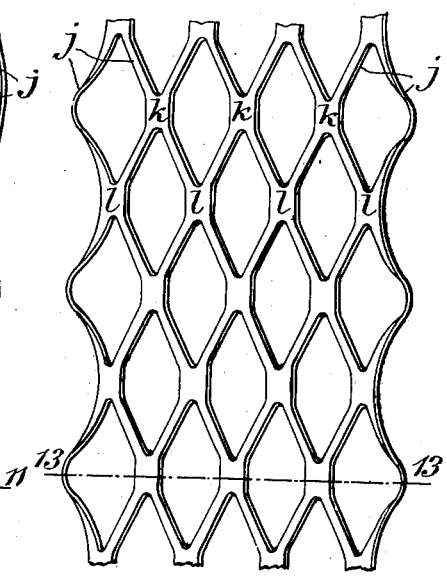
Figure 6:
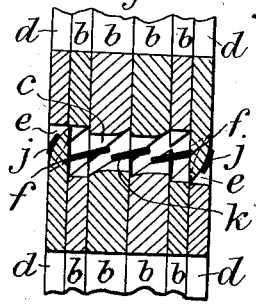
Figure 11:
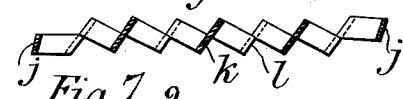
Figures 7, 13:
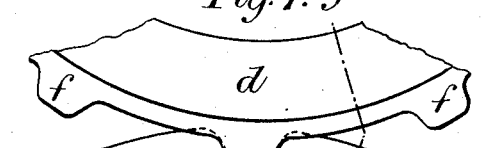
Figure 9:
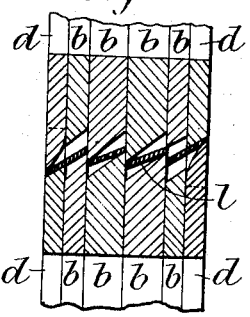
Figure 8:
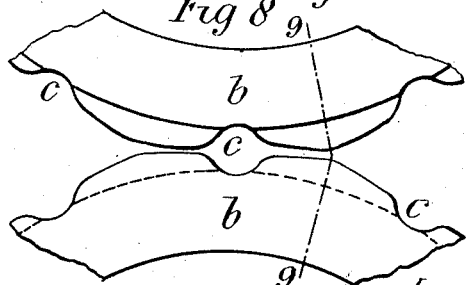
Figure 14:
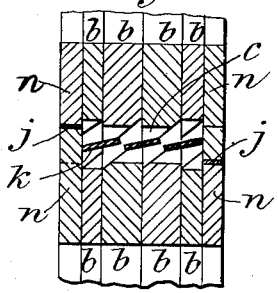
Figure 15:
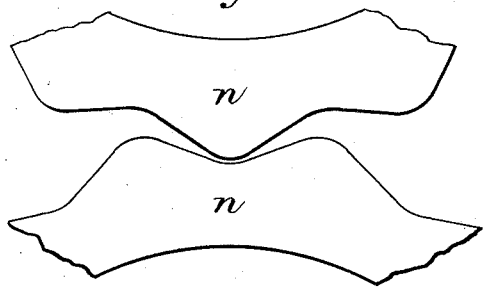
Figure 17:
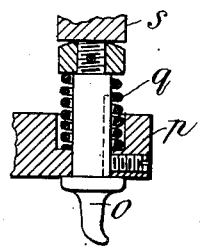
Figure 18:
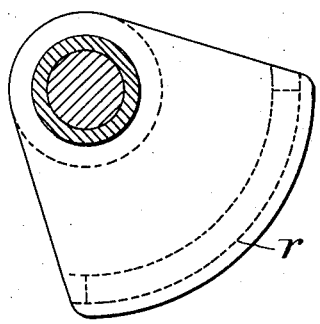
Figure 16:
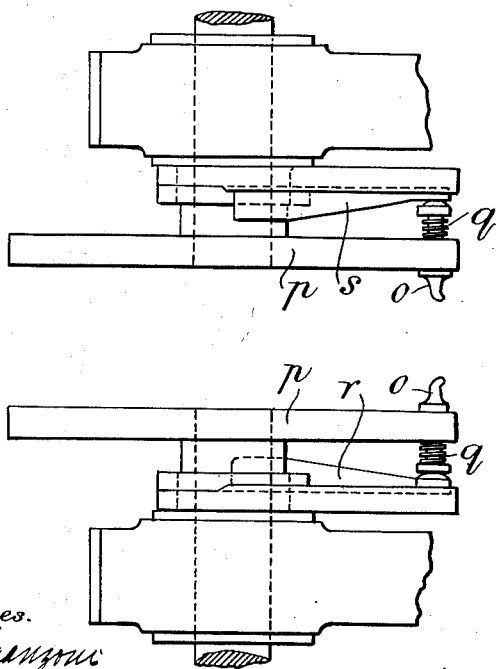
Figure 19:
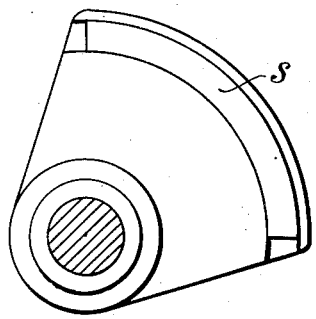

Figure 1 shows the slit sheet. Fig. 2 is a plan of the rolls and wheels, and Fig. 3 is a sectional elevation of Fig. 2, the gearing for driving the rolls and wheels is well understood and is not shown. Figs. 4 and 5 are end elevations of the expanding wheels showing the positions of the sheet at the commencement and termination of the expanding operation. Fig. 6 is a longitudinal section showing to a larger scale half of each of the preparing rolls. Figs. 7 and 8 are elevations of the outer and inner portions of the rolls (Fig. 6). Fig. 9 is a section similar to Fig. 6 on the lines 9—9, Figs. 7 and 8. Fig. 10 shows the sheet after it has passed through the preparing rolls and before it has been expanded. Fig. 11 is a section on the line 11—11, Fig. 10. Fig. 12 shows the expanded sheet and Fig. 13 is a section on the line 13—13, Fig. 12. Figs. 14 to 19 show a modification. Figs. 14 and 15 are similar views to Figs. 6 and 7. Fig. 16 is a plan of the expanding wheels. Fig. 17 is a section of one of the teeth and Figs. 18 and 19 are side elevations of the cams operating the teeth.

$a$ are the slitting rolls the details of which are well known and do not require any description. Each of the preparing rolls is built up of four inner rolls $b$ (which are conical in form and have notches $c$ in them at regular intervals to receive the junctions of the slit sheet) and two outer rolls $d$. The rolls $d$ are also of conical form and the right hand lower roll, Fig 7, has notches $e$ in it while the right hand upper roll is provided with teeth $f$ engaging with the notches. Similarly the left hand lower roll $d$ is provided with teeth $f$ and the left hand upper roll with notches $e$. The expanding wheels $g$ are irregular polygons the edges of which are parallel to their axes and have teeth $h$ projecting radially at regular intervals from their angles as shown at Figs. 3 to 5.

The method of operation is as follows:— A sheet of metal is passed through the rolls $a$ and is slit as shown at Fig. 1, being divided into parallel strips $j$ connected by junctions $k$ and $l$, there being three junctions $k$ in a row and four junctions $l$. The slit sheet travels on to the preparing rolls and in passing through them the junctions $k$ are received in the notches $c$ and are not materially acted on but the two strips $j$ at the sides of these junctions are bent almost at right angles to the sheet by the teeth $f$ as shown at Figs. 6 and 11. The junctions $l$ are acted on by the conical part of the rolls $b$ and are turned to an angle to the plane of the sheet as shown at Fig. 9. The sheet thus prepared passes through the guide $m$, Fig. 3, on to the wheels $g$, the teeth $h$ of which enter the holes formed as above described between the turned up outer strips $j$ and the junctions $k$ the outer strips $j$ themselves lying more or less flatly on the flat edges of the polygonal wheels. These wheels revolve in opposite directions as shown by the arrows (Figs. 3, 4 and 5) so that the sheet (the edges of which are taken hold of by the teeth when it is in a horizontal position Fig. 4) is tilted and expanded the expansion being completed as each tooth comes vertically above or below the axis of its wheel (as the case may be) as shown at Fig. 5. The continued revolution of the wheels frees the teeth from the edges of the expanded sheet.

The modification shown at Figs. 14 to 19 is very similar to that above described but in this case the teeth are on the side faces of the expanding wheels instead of on their edges and the method of forming the holes at the edges of the prepared sheet is altered accordingly. The slitting rolls *a* and the conical rolls *b* are as before but the rolls *d* are replaced by corrugated rolls *n*, Figs. 14 and 15, whose edges are parallel to their axes. These rolls bend the outer strips *j* at the two sides of the junctions *k* upward and downward respectively from the plane of the sheet, the planes of the strips and sheet being parallel to each other as shown at Fig. 14. The teeth *o* of the expanding wheels *p* are not fixed to them but pass through them from side to side.

*q* are springs tending to draw the heads of the teeth toward the wheels and *r* and *s* are stationary cam surfaces which force the teeth outward. The drawings for simplicity only show a single tooth on each of the wheels *p* but it will be understood that they have teeth all around them at regular intervals like the wheels *g*. The cams *r* and *s* force the teeth *o* away from their wheels and cause them to engage with the holes at the edges of the sheet as it comes out of the guide *m*. When the teeth are respectively vertically above and below the axes of their wheels they come to the ends of the cams and are suddenly withdrawn by their springs thus freeing the expanded sheet. By varying the length of the cams so that the teeth are withdrawn somewhat sooner the amount of expansion can be regulated.

What I claim is:—

1. The method of making expanded metal consisting in dividing a sheet into parallel strips connected by junctions of uncut metal, turning the inside strips in pairs to an angle to the plane of the sheet, separating the portions of the two edge strips between the junctions from the adjacent strips thus forming holes at the edges of the sheet and causing the holes to engage with teeth on a pair of wheels revolving in opposite directions.

2. The method of making expanded metal consisting in dividing a sheet into parallel strips connected by junctions of uncut metal, turning the inside strips in pairs to an angle to the plane of the sheet, separating the portions of the two edge strips between the junctions from the adjacent strips by bending them out of the plane of the sheet thus forming holes at the edges of the sheet and causing the holes to engage with teeth on a pair of wheels revolving in opposite directions.

HARRY SALMON.

Witnesses:
T. HARRY TILLY, Jr.,
JAS. T. NICHOLSON.